Feb. 3, 1925. 1,524,704
N. FORE
WASHCLOTH CABINET
Filed Feb. 13, 1923
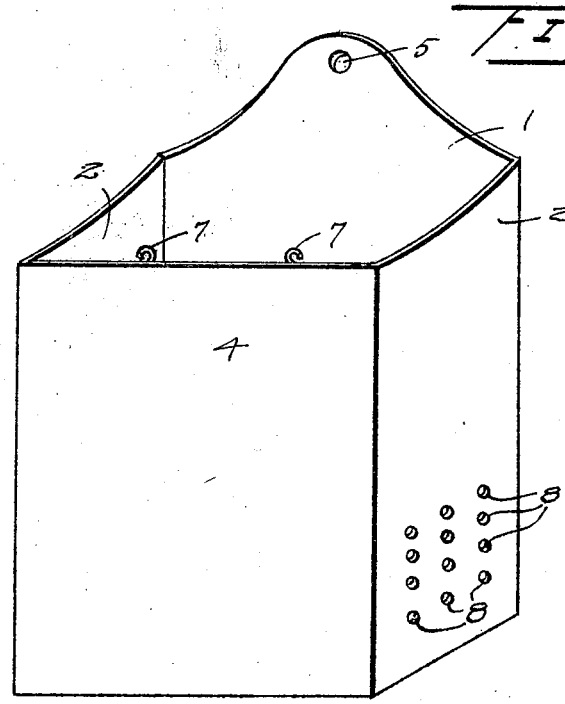
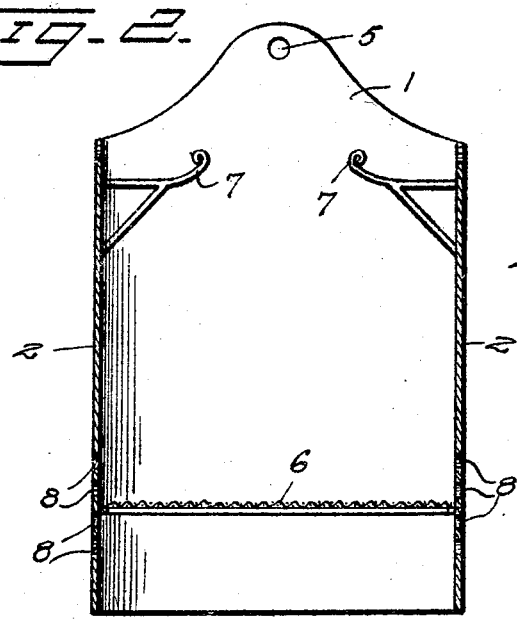
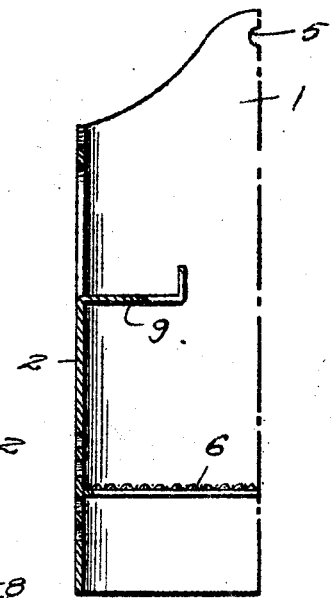
Inventor
Nels Fore.
By William J. Jacobi
Attorney Patented Feb. 3, 1925.

1,524,704

UNITED STATES PATENT OFFICE.

NELS FORE, OF PLUMMER, MINNESOTA.

WASHCLOTH CABINET.

Application filed February 13, 1923. Serial No. 618,855.

*To all whom it may concern:*

Be it known that NELS FORE, a citizen of the United States, residing at Plummer, in the county of Red Lake and State of Minnesota, has invented certain new and useful Improvements in Washcloth Cabinets, of which the following is a specification.

The object of this invention is to provide a washcloth holder or cabinet in which the washcloth may be suspended in a convenient position within the cabinet for withdrawal and use, thus dispensing with the necessity of having to hunt for a washcloth when one is desired.

A further object of the invention is to provide a washcloth holder or cabinet in which the bottom of the cabinet is provided with a screen bottom to permit a passage of air to pass upwardly to the cabinet and assist in drying the washcloths which are suspended on hooks supported by the side of the cabinet.

A still further object of my invention is to provide a washcloth holder or cabinet, which is simple in construction, durable, efficient for the purpose intended and one that can be manufactured and placed on the market at a relatively low cost.

An additional object of my invention is to provide a washcloth holder or cabinet which consumes very little space and when hung upon a nail or hook in a wall will be both ornamental and attractive to the eye.

These and like objects of my invention will be better understood as the description proceeds and as is specifically pointed out in the appended claims.

In the accompanying drawing forming a part of this specification.

Figure 1 is a perspective view of my washcloth holder or cabinet.

Figure 2 is a front elevation of same with the cover or front plate removed.

Figure 3 is a sectional view showing a slightly modified form of the invention.

In the drawing, the numeral 1 indicates the rear wall of my improved cabinet, 2—2 the side walls and 4 the front wall. The numeral 5 represents an aperture formed in the upper portion of the rear wall 1 by which the cabinet may be supported on a nail or other object driven in the wall.

The numeral 6 designates a screen positioned within the cabinet adjacent the bottom of same to permit air to circulate through said cabinet and come in contact with the washcloth adapted to be supported on brackets 7—7 secured in any suitable manner to the inner faces of the side walls 2. The brackets 7—7 can also be of any desired shape and size. The side walls of the cabinet are provided with a series of openings indicated by the numeral 8, which also permit a circulation of air through the cabinet.

In Fig. 3 I have shown a slightly modified form of invention, wherein brackets 9 are struck out of the walls of the cabinet and so bent as to form hooks or supports for the washcloths.

From the foregoing description of my invention it can be readily seen that when washcloths are placed on the hooks 7 or 9 within the cabinet, that the air circulating through the bottom and side walls of same will quickly dry the washcloths, thus keeping them in a sanitary condition.

While I have shown and described the preferred form of my invention, I realize that various minor changes may be resorted to, without departing from the spirit and scope of the invention as shown, therefore, I do not wish to limit myself to the exact details of construction shown, nor to the combination and arrangement of parts.

What I claim as new and desire to secure by Letters Patent is:—

1. As an article of manufacture, a washcloth holder consisting of a single blank of material bent to form an open-ended enclosure of substantially rectangular design, the side walls adjacent the lower ends being provided with a series of perforations, a screened sheet secured between the walls of said enclosure immediately adjacent said perforations and forming substantially a foraminous bottom therefor, and supporting brackets carried on the walls within the enclosure above said bottom.

2. As a new article of manufacture, a washcloth holder consisting of a single piece of material formed to provide a cabinet, supporting hooks struck from the walls of the cabinet and bent inwardly to support washcloths within the cabinet, and a screened bottom positioned in said cabinet to permit a free circulation of air through same.

In testimony whereof I affix my signature.

NELS FORE.